(No Model.)

J. D. MONAT.
WATER HEATER.

No. 443,104. Patented Dec. 23, 1890.

WITNESSES
C. J. Shipley
Marion A. Reeve

INVENTOR
John D. Monat
Attorneys.

UNITED STATES PATENT OFFICE.

JOHN D. MONAT, OF DETROIT, MICHIGAN.

WATER-HEATER.

SPECIFICATION forming part of Letters Patent No. 443,104, dated December 23, 1890.

Application filed February 3, 1890. Serial No. 339,026. (No model.)

*To all whom it may concern:*

Be it known that I, JOHN D. MONAT, a citizen of the United States, residing at Detroit, county of Wayne, State of Michigan, have invented a certain new and useful Improvement in Water or Steam Heaters; and I do declare the following to be a full, clear, and exact description of the invention, such as will enable others skilled in the art to which it pertains to make and use the same, reference being had to the accompanying drawings, which form a part of this specification.

Figure 1:
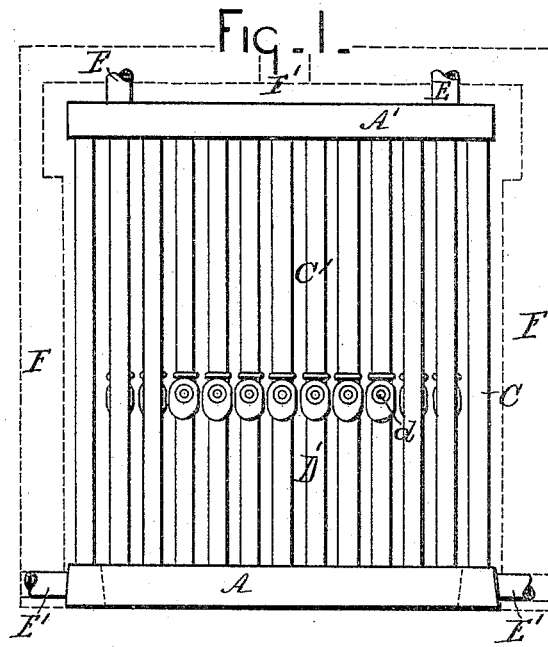
Figure 2:
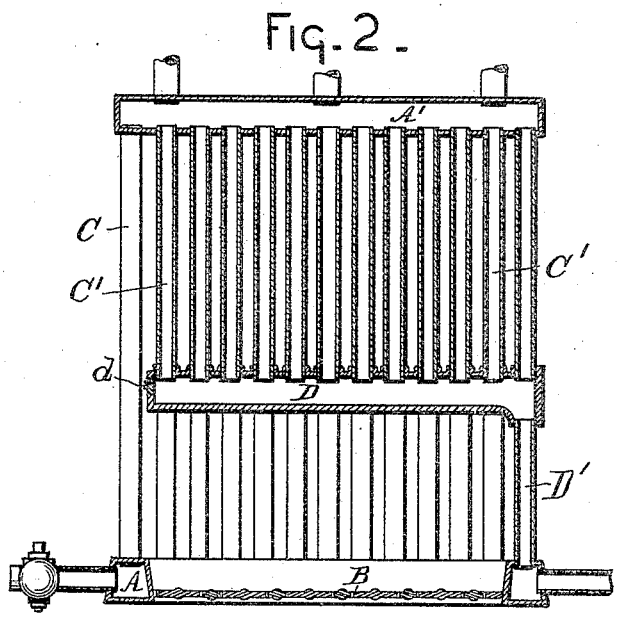

In the drawings, Figure 1 is a front elevation of a portion of a furnace, illustrating my invention. Fig. 2 is a sectional view at right angles to Fig. 1.

It is the purpose of my invention to produce a heater adapted both for water and steam, which is adapted for a rapid heating of the water, and in which the circulation is thoroughly maintained and access had to the parts which need cleansing from time to time.

To this end, A represents a manifold at the base of my furnace. B represents a grate of any ordinary construction located at or about the level of this manifold.

A' represents a shell at the top of the stove, of dimensions corresponding with the cross-sectional dimensions of the furnace and adapted to receive the upper ends of all the circulating-pipes.

C represents a series of upright circulating-pipes extending from the lower manifold A up to the upper chamber A'. These circulating-pipes surround the combustion-chamber above the grate and constitute, as it were, the walls of the said combustion-chamber.

C' represents a series of shorter pipes, each tapped into the chamber A' at their upper ends and at their lower ends united with manifolds D. These manifolds D are arranged side by side, or at least parallel with each other from front to rear of the furnace above the fuel-bed. The pipes C' are arranged likewise along the said manifolds, as shown in Fig. 2, as closely together as it is convenient to arrange them. The rear end of each of these manifolds D is connected by a stand-pipe D' with the manifold B at the base of the furnace.

E represents steam or water outflow pipes at the top of the furnace, and E' represents the return-pipes leading to the manifold at the base of the furnace. If this furnace is designed for water circulation, of course pipes E and the entire circuit of the said pipes are maintained full of water; but if it is designed for the generation of steam these pipes E may connect the shell or chamber A' with a suitable steam drum or dome, from which the steam-pipes may lead in the usual way.

F represents a furnace wall or casing. It constitutes no part of my invention, but shows how the wall may be arranged, and how I have been in the habit of arranging it with respect to my circulating-tubes, whereby the products of combustion are caused to circulate thoroughly from the fuel-bed on the grate up through and about the tubes and out through the exit-flow F'.

d represents removable plugs, which may or may not be located in the forward ends of the manifolds D. They are designed to afford means of access to the interior for the removal of such scale or sediment which might form obstruction to the free circulation of the water or afford resistance to the ready transmission of heat from the furnace to the water within the manifolds.

In a furnace of this construction it is manifest that the largest possible surface is presented to the heated products of combustion, so that should any tube become disarranged or out of order it necessitates only the removal of the intervening tubes of its manifold to gain ready access thereto. So, also, the tubes being all vertical are not liable to become clogged with sediment. The circulation through each manifold D is also so rapid, because of the large number of tubes rising therefrom, that sediment is not apt to be deposited therein, while, on the other hand, should it be deposited therein the opening of a mud-valve or blow-off cock at the base of the furnace would cause so rapid and contrary circulation through each manifold D as to insure the washing out of any such deposit; and, finally, the manifolds D are the only parts of the furnace in which cast-iron is subjected to any considerable degree of heat, and in these cases the joints are all on the upper sides of the manifolds farthest removed from the direct radiation of heat from the bed of fuel.

What I claim is—

1. A steam or water heater, the same consisting of the combination, with an open manifold at the base and a chamber extending across the top, of interposed circulating-pipes C, extending from the base of the manifold to the top about the combustion-chamber, a series of manifolds D, extending from front to rear, arranged across the furnace above the grate, and a series of circulating-pipes C', extending in a continuous unbroken series from front to rear and connecting each said manifold with the chamber A' at the top of the furnace, substantially as and for the purposes described.

2. The combination, with a manifold extending around the base of the furnace and having an open space within its confines for the grate, of a chamber extending over the entire top of the furnace, circulating-pipes C, uniting the manifold with the said chamber, a series of manifolds D, arranged parallel with each other from front to rear of the furnace and each provided with a series of circulating-pipes C', extending in a continuous unbroken series from front to rear and connecting it with the said chamber, and outflow-conduits leading into the manifold at the base, all substantially as and for the purposes described.

3. The combination, with the manifold A and chamber A', of the circulating-pipes C C', the latter extending in a continuous unbroken series across the furnace from front to rear, and manifolds D, each of said manifolds provided at its rear end with a circulating-pipe D', substantially as and for the purposes described.

In testimony whereof I sign this specification in the presence of two witnesses.

JOHN D. MONAT.

Witnesses:
M. A. REEVE,
W. W. LEGGETT.